United States Patent Office 3,637,550
Patented Jan. 25, 1972

3,637,550
SILANATED POLYAMIDE ADHESIVE AND
ITS PREPARATION
Jerome W. Sprauer, Wilmington, Del., assignor to E. I. du
Pont de Nemours and Company, Wilmington, Del.
No Drawing. Continuation-in-part of applications Ser. No.
630,548, Apr. 13, 1967, and Ser. No. 832,422, June 11,
1969. This application Jan. 23, 1970, Ser. No. 5,353
Int. Cl. S08h 9/00; C09j 3/14
U.S. Cl. 260—18
17 Claims

ABSTRACT OF THE DISCLOSURE

Adhesive binders for bare metal substrates predominantly comprising a thermoplastic silanated polyamide prepared by melt blending a melt-polymerized polyamide consisting essentially of recurring carboxyamido groups and at least two different species of recurring hydrocarbylene groups selected from the group consisting of aliphatic and alicyclic groups of 2 to 48 carbon atoms as integral parts of the main polymer chain, and having at least three different recurring polyamide repeat units, a crystalline melting point below about 230° C., a melt index of about 0.1 to 200, a moisture content of less than about 0.5 weight percent, and at least as many amine ends as carboxyl ends, at a temperature above the crystalline melting point of the polyamide, with about 0.1 to 3 percent, based on the weight of the polyamide, of a silanating compound of the formula $(RO)_3$—Si—$R^1$—Q in which R is alkyl or alkoxyalkyl, $R^1$ is hydrocarbylene selected from the group consisting of saturated aliphatics, saturated alicyclics and aromatics of 2 to 40 carbon atoms, and Q is a radical selected from the group consisting of amine, oxirane, alkoxycarbonyl, carboxyl, hydroxyl, aldehyde, amide, anhydride, carbamate, isocyanate, isocyanide, isothiocyanate, isothiourea, ketoxime, lactide, mercapto, oxime, ozonide, peroxide, thial, thiocyanate and ureido.

CROSS-REFERENCE TO RELATED APPLICATIONS

This is a continuation-in-part of copending applications Ser. No. 630,548, filed Apr. 13, 1967, now abandoned, and Ser. No. 832,422, filed June 11, 1969, now abandoned.

BACKGROUND OF THE INVENTION

Polyamides have long been known as adhesive binders, both alone, cf. U.S. Pats. 2,071,250; 2,190,770; 2,285,009; 2,374,126; 2,450,940; and in combination with epoxides to improve bond strength and temperature resistance, cf. U.S. Pats. 2,705,223; 2,962,468; 2,970,077; 2,986,539; 3,261,882. The partially-crystalline high-molecular weight polyamides are generally preferred for an advantageous combination of easy processability, high shear strength, high peel strength and toughness. Hitherto, however, such adhesive binders have been significantly water-sensitive and even the best have not given outstanding adhesive performance on bare metal substrates.

SUMMARY OF THE INVENTION

In accordance with the present invention there are provided outstanding adhesive binders predominantly comprising a thermoplastic silanated polyamide prepared by melt-blending a melt-polymerized polyamide consisting essentially of recurring carboxyamido groups and at least two different species of recurring hydrocarbylene groups selected from the group consisting of aliphatic and alicyclic groups of 2 to 48 carbon atoms as integral parts of the main polymer chain, and having at least three different recurring polyamide repeat units, a crystalline melting point below about 230° C., a melt index of about 0.1 to 200, a moisture content of less than about 0.5 weight percent, and at least as many amine ends as carboxyl ends, at a temperature above the crystalline melting point of the polyamide, with about 0.1 to 3 percent, based on the weight of the polyamide, of a silanating compound of the formula $(RO)_3$—Si—$R^1$—Q in which R is alkyl or alkoxyalkyl, $R^1$ is hydrocarbylene selected from the group consisting of saturated aliphatics, saturated alicyclics and aromatics of 2 to 40 carbon atoms, and Q is a radical selected from the group consisting of amine, oxirane, alkoxycarbonyl, carboxyl, hydroxyl, aldehyde, amide, anhydride, carbamate, isocyanate, isocyanide, isothiocyanate, isothiourea, ketoxime, lactide, mercapto, oxime, ozonide, peroxide, thial, thiocyanate and ureido.

DETAILED DESCRIPTION OF THE INVENTION

The polyamides used in accordance with this invention are melt-polymerized polyamides consisting essentially of recurring carboxyamido groups and at least two different species of recurring hydrocarbylene groups selected from the group consisting of aliphatic and alicyclic groups of 2 to 48 carbon atoms as integral parts of the main polymer chain. The recurring carboxyamido groups are separated by the hydrocarbylene groups.

The term "polyamide consisting essentially of," as used throughout the specification and claims, is meant to exclude only polyamides containing unspecified groups which prevent the results of this invention from being realized. That is, this term excludes only polyamides containing unspecified groups of the type and in amounts which prevent the formation of the silanated polyamides of this invention, or materially affect the basic and novel characteristics of the silanated polyamides of this invention. Polyamides consisting essentially of divalent aliphatic and/or alicyclic hydrocarbon radicals of at least two different species, joined by carboxyamido groups, may also include ether, imine or ester linkages in the main polymer chains, alkoxy side chains, and alkyl, hydroxyalkyl or alkoxyalkyl groups replacing hydrogen attached to nitrogen. More specifically, a minor amount e.g., 0.5 to 1 mole percent of diethylene triamine may be advantageously used in place of hexamethylene diamine to introduce a low concentration of secondary imine-links in the polymer chain. One might also include minor amounts of terephthalic acid or p-aminocyclohexyl-bis-methane to raise the glass transition temperature slightly for some special reason. Preferably the hydrocarbylene groups are alkylene groups.

The polyamides used in accordance with this invention must contain at least 3 different recurring polyamide repeat units. By "polyamide repeat unit" is meant a polymer unit of the structure

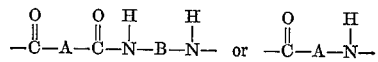

in which A and B are the same or different hydrocarbylene groups. This means that the polyamide must be derived from at least 3 and usually at least 4 different polyamide-forming monomers.

The crystalline melting point of the polyamide can be adjusted or selected within limits to suit the need. The melting point of a given polyamide is dependent upon the particular monomers from which it is derived. The crystalline melting point of the polyamides used herein should be below about 230° C. in order to retain processing advantages, and in some cases is advantageously below about 190° C. Preferably the melting point is in the range of about 120° to 210° C. and most preferably is in the range of about 160° to 190° C.

Accepted procedures for determining crystalline melting points of polyamides are described in ASTM D789–66 and ASTM D2117–64. It has become commonplace also to observe melting points by established methods of differential thermal analysis. In general, these methods agree within a few degrees. However, with polymers of lower degrees of crystallinity, these methods become increasingly subjective and difficult to interpret. It has been found that the upper limit of the crystalline melting point, even with polymers of very low crystallinity, can be determined most precisely and objectively by observing the minimum flow temperature, that is, the temperature of incipient flow of a sample in the melt index apparatus of ASTM D1238–57T as the temperature is gradually increased from below the melting point. In general, such an observed minimum flow temperature will be at most only a few degrees higher than melting points otherwise observed.

The melt index of the polyamides used herein must be at least about 0.1 to provide processability, and less than about 2000, and preferably less than about 200, in order to provide adequate strength and toughness. The preferred products have a melt index of about 1 to 100. Melt index is an empirical measurement of inverse melt viscosity and is measured according to ASTM test method D1238–57T, by extruding the polyamide at a temperature of 190° C., using a 2160 gram weight, the melt index being the number of grams extruded per 10 minutes. The melt index of polymers with melting points above 190° C. obviously must be determined at a higher temperature. Conveniently this can be done at 230° C. with a standard 2160 g. weight. The term "melt index," as used throughout the specification and claims, unless otherwise specified, refers to the determination at 190° C. As a rough approximation, a melt index at 230° C. is about 5 times the melt index at 190° C. when the comparison is made on low-melting polymers. It is well-known to regulate the melt index of melt-condensed polyamides by the inclusion of small amounts of monofunctional or trifunctional amines or acids, as well as by providing an excess of either acid or amine ends.

One preferred class of suitable melt-polymerized polyamides includes alcohol-soluble polyamides consisting essentially of recurring carboxamido groups and at least two different species of recurring hydrocarbylene groups selected from the group consisting of aliphatic and alicyclic groups of 2 to 40 carbon atoms as integral parts of the main polymer chain, and having at least 3 different recurring polyamide repeat units. By "alcohol-soluble polyamide," as used herein, is meant polyamide which is sufficiently soluble to provide 5 weight percent solutions in a monohydroxyalkane of 1 to 5 carbons or a mixture of one or more such alcohols at the normal atmospheric boiling point of such alcohol or alcohol mixture. Typical alcohol-soluble polyamides and methods of obtaining them are disclosed in U.S. Pats. 2,285,009; 2,320,088; 2,388,035; 2,393,972; and 2,450,940.

A second preferred class of melt-polymerized polyamides includes those in which (a) about 33–100 mole percent of the imine groups are derived from polymethylene diamine of 6 to 20 carbons, (b) about 5–65 mole percent of the carbonyl groups are derived from dimerized fatty acid of 16 to 48 carbon atoms, (c) about 8–65 mole percent of the carbonyl groups are derived from polymethylene diacid of 6 to 18 carbon atoms, and (d) about 8–65 mole percent of the carbonyl groups are derived from monomer selected from the group consisting of (1) polymethylene diacid of 6 to 18 carbon atoms which is different from diacid (c), and (2) polymethylene omega-aminoacid of 6 to 18 carbon atoms. These polyamides have an annealed heat of fusion of about 5 to 18 calories per gram, are quenchable to the amorphous state at a cooling rate of about 100° C. per minute, and have an upper glass transition temperature in the amorphous state of less than about 30° C. When these polyamides are silanated by melt-blending in accordance with this invention, adhesives of outstanding peel strength are obtained.

A particularly preferred class of polyamides includes those in which (a) about 98–100 mole percent of the imine groups are derived from hexamethylene diamine, (b) about 15–55, and preferably 25–55, mole percent of the carbonyl groups are derived from dimerized fatty acid of 36 carbon atoms, (c) about 10–45, and preferably 15–45, mole percent of the carbonyl groups are derived from adipic acid, and (d) about 15–55, and preferably 15–45, mole percent of the carbonyl groups are derived from polymethylene diacid of 10 to 12 carbon atoms. Most preferably, these polyamides have a minimum flow temperature of about 160° to 210° C.

Suitable polymethylene diamines for preparing suitable polyamides include hexamethylene diamine, heptamethylene diamine, octamethylene diamine, nonamethylene diamine, decamethylene diamine, undecamethylene diamine, dodecamethylene diamine, tridecamethylene diamine, and octadecamethylene diamine. Suitable polymethylene diacids for preparing suitable polyamides include adipic, pimelic, suberic, azelaic, sebacic, dodecanedioic, brassylic, tetradecanedioic and octadecanedioic acids. Suitable aminoacids include 6-aminocaproic, 7-aminoheptanoic, 8-aminocaprylic, 9-aminononanoic, 10-aminodecanoic, 11-aminoundecanoic, 17-aminoheptadecanoic, and the like.

By "dimerized fatty acid of 16 to 48 carbons" is meant dimers derived from fatty acids of 8 to 24 carbons. These dimerized fatty acids are commercially available materials which have been fully described in the literature including U.S. Pat. Nos. 3,157,681 and 3,256,304. These dimerized fatty acids are obtained by catalytic or non-catalytic polymerization of ethylenically unsaturated fatty acids. Suitable catalysts for the polymerization include acid or alkaline clays, di-t-butyl peroxide, boron trifluoride and other Lewis acids, anthraquinone, sulfur dioxide, and the like. Non-catalytic polymerization generally requires higher temperatures. Suitable fatty acids for use in the polymerization include branched and straight chain, poly- and monoethylenically unsaturated acids such as 3-octenoic acid, 11-dodecenoic acid, linderic acid, lauroleic acid, myristoleic, tsuzuic, palmitoleic acid, petroselinic acid, oleic acid, elaidic acid, vaccenic acid, gadoleic acid, cetoleic acid, nervonic acid, linoleic acid, linolenic acid, eleostearic acid, eciosatetraenoic acid, nisinic acid, scoliodonic acid, and chaulmoogric acid. Quite often mixtures of these acids are used. Because of their ready availability and relative ease of polymerization, oleic and linoleic acids are the preferred starting materials for preparing dimerized fatty acids. At the present time the most preferred fatty acid is linoleic acid which is readily available in crude mixtures such as linseed oil, safflower oil and tall oil.

Dimerized fatty acids generally contain at least about 60 percent of dimer in admixture with small amounts of monomer and trimer. These mixtures are frequently distilled to increase the dimer content by removal of monomer and trimer as described in U.S. Pat. No. 3,297,730. Preferably the dimerized fatty acid has a dimer content of at least about 90 percent. Dimerized fatty acids are also frequently hydrogenated as taught in U.S. Pat. No. 3,256,304 to reduce their color. The most preferred dimerized fatty acid is hydrogenated and has a dimer content of at least about 95 percent.

It is not necessary that the above recited polyamide-forming monomers be used per se in the polymerization reaction. It is necessary only that the resulting polyamide repeat units correspond to those derived from the recited monomers. The actual materials used in the polymerization reaction may be the recited monomers or polyamide-forming derivatives of these monomers, such as the acid chloride, ammonium salt, ester half-ester, and the like. Lactams such as caprolactam may be used in place of amino acids such as 6-aminocaproic acid.

The method of forming polyamides by melt-condensation is well known to those skilled in the art. This polymerization reaction is described, for example, in U.S. Pat. Nos. 2,252,554 and 2,285,009, and British Pat. No. 1,055,676. The reaction is carried out by heating diacids and diamines, or their polyamide-forming derivatives, and, if desired, aminoacids or their polyamide-forming derivatives at temperatures of about 150° to 300° C. while driving off water, and continuing the reaction until the desired molecular weight is obtained. The resulting polyamide will contain substantially equimolar amounts of carbonyl groups and imine groups. The polymer end groups will be carboxylic acid and amine, one of which may be in slight excess depending upon which reactant was present in excess. In accordance with this invention there should be at least as many amine ends as carboxyl ends.

Adhesive binders in accordance with the invention are prepared by melt blending a dry and nonacidic polyamide of the above-specified class, containing less than 0.5 and preferably less than 0.2 weight percent moisture, and preferably containing at least as many amine ends as acid ends, of melt index of at least 0.1, and preferably at least 1, at a temperature above its crystalline melting point, with 0.1 to 3 percent of its weight of a silanating compound. If the polyamide contains substantially more than about 0.5 percent moisture or a substantial excess of acid ends over amine ends, a processable thermoplastic polymer providing bonds of significantly improved moisture resistance is not obtained. The silanating compound will be one containing an oxy-silylene-hydrocarbylene group and having the oxy groups directly attached to alkyl or alkoxyalkyl, and the hydrocarbylene group directly attached to a functional group which is more chemically reactive with the polyamide than the oxysilylene group. Preferably, the functional group is an amine, an alkoxy carbonyl group, or an oxirane group.

Such compounds are thus of the general formula

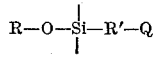

where R is alkyl or alkoxyalkyl, R' is hydrocarbylene selected from the group consisting of saturated aliphatics, saturated alicyclics, and aromatics of 2 to 40 carbon atoms, and Q is a radical selected from the group consisting of amine, oxirane, alkoxycarbonyl, carboxyl, hydroxyl, aldehyde, amide, anhydride, carbamate, isocyanate, isocyanide, isothiocyanate, isothiourea, ketoxime, lactide, mercapto, oxime, ozonide, peroxide, thial, thiocyanate and ureido.

Preferably, the additional valences of the Si are satisfied by additional O—R groups, in which case the silanating compound is of the formula $(RO)_3-Si-R^1-Q$, but they may also be satisfied by hydrogen or hydrocarcarbyl. Correspondingly, where Q is amine radical, one of the amine hydrogens may be substituted by alkyl or one or both of the amine hydrogens may be substituted by aminoalkyl or hydroxyalkyl.

Examples of useful amine-functional alkoxy silanes of this general formula and methods of preparing them are disclosed in U.S. Pats 2,832,754 and 2,930,809. Examples of useful oxirane-functional alkoxy silanes of this general formula are disclosed in U.S. Pat. 2,946,701 and Plueddemann and Fanger, J. Am. Chem. Soc. 81, 2632–34 (1959). Examples of useful alkoxycarbonyl-functional alkoxy silanes of this general formula are disclosed in British specification 882,098. Examples of a wide range of functional groups, Q in the above formula, are given in U.S. Pat. 3,288,754. These citations also illustrate silanes in which the hydrocarbylene linking group, R' in the above formula, is saturated aliphatic, saturated alicyclic or aromatic.

The oxy-silylene-hydrocarbylene groups of the silanating compound are bonded through the hydrocarbylene radical to an oxygen, nitrogen or carbon atom of the polyamide, and are attached directly to alkyl or alkoxyalkyl at the oxy group. The exact proportion of oxy-silylene-hydrocarbylene groups to polyamide in the adhesive is not highly critical. The proportion will generally be in the range of about 0.1 to 3 percent by weight of the silanated polyamide and preferably about one percent. These hydrocarbylene groups also contain 2 to 40 and generally 2 to 10 carbon atoms.

Although it is not intended to limit this invention to any particular theory, it is believed that ordinary oxidizable bare metal substrates normally have hydroxylated surfaces, and that these surfaces react with the alkoxy silylene-polyamide molecules described above to eliminate alcohol or water, thus forming a chemical bond of the formula

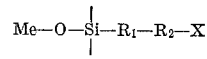

where Me represents the substrate metal, $R^1$ represents hydrocarbylene, $R^2$ represents a linking function, and X represents a polyamide radical, and that such bonds are stronger and more resistant to hydrolysis than the bonds formed when polyamides are heated in contact with such surfaces in the absence of such silicon compounds. It is, of course, unnecessary for more than a fraction of the polyamide molecules to be so reacted, since the polyamide portion of the silanated molecules and the non-silanated molecules together provide a bond strength equal to the internal strength of the polyamide.

Examples of metals which may be bonded in accordance with the present invention include steel, stainless steel, aluminum, iron, copper, tin, zinc, titanium, magnesium, nickel, chromium, lead, beryllium and alloys thereof. The silanated polyamides of this invention give an unusually high and durable peel strength on ordinary cold rolled or hot rolled low carbon steel without rigorous cleaning procedures. The surface of the metal may, however, be solvent washed or vapor-degreased, and may also be oxidized, anodized, chromatized, phosphatized, or given other similar chemical treatment, if desired. A clean surface is preferred, but special pickling, etching, abrading and the like are not needed. The silanated polyamides of this invention give high peel performance on so-called "tin-free steel," that is, chemically processed or chromated or chromized low carbon steel. Simultaneously, they give acceptable performance on organically coated "tin-free steel." For bare metal adhesion it is preferable that the polyamide contain about $10 \times 10^{-6}$ to $100 \times 10^{-6}$ equivalents per gram of excess amine ends, at least some of which are present as imine-links in the polymer chain, and be reacted with an epoxy-functional trialkoxy silane, thereby producing pendent silane groups reactive with the air-exposed metal surface.

In addition to the silanated polyamides described above, the adhesive binders of the invention may also include polyepoxides, such as those disclosed in Lee and Neville, "Epoxy Resins," McGraw-Hill Book Company, New York (1957), Chapter 1. The preferred polyepoxides are those having at least two epoxy groups per molecule, with the remainder of the molecule being a hydrocarbon chain interrupted with ether linkages, particularly those obtained by catalyzed reaction of polyhydroxy alcohol such as propylene glycol, trimethylol propane, bis(4-hydroxyphenyl) propane, and the like with an excess of epichlorohydrin. Examples of such polyepoxides are disclosed in U.S. Pats. 2,582,985 and 2,694,694. Those having an epoxy equivalence of 170 to 500 are preferred, and particularly those derived from epichlorohydrin and bis(4-hydroxyphenyl) propane. The amount of polyepoxide will generally be in the range of 1 to 35 weight parts per 100 weight parts of total silanated polyamide and polyepoxide constituting the adhesive binder. Relatively small amounts of polyepoxide provide thermoplastic bonds; moderate amounts provide thermosettable compositions of appreciable pot life; and large amounts provide quicker setting compositions. In general, the adhesive performance of a silanated polyamide and polyepoxide in combination is better than a silanated polyamide alone or the unsilanated polyamide-epoxide combination. That is, the effect is synergistic. Reactivity of the polyepoxides may be increased by use of basic catalysts. Dicyandiamide is preferred since it has a latent action activated by heating.

In preparing and using the adhesive binders, it is necessary to avoid prolonged heating in the presence of moisture prior to developing a bond to the metal, inasmuch as such treatment tends to convert the alkoxy silane group to siloxane, which is ineffective for the purposes of this invention. Similarly, where thermosetting amounts of polyepoxides are included, it is necessary to avoid overlong heating of the ingredients in the molten state prior to wetting the metal substrate to be bonded, inasmuch as such treatment tends to gel the binder, thus interfering with development of maximum bond strength.

EXAMPLES OF THE INVENTION

The following examples, illustrating the novel silanated polyamides disclosed herein and their utility are given without any intention that the invention be limited thereto. In the examples, all percentages are by weight unless otherwise specified. The polyamide precursors contained less than 0.5 weight percent moisture and had an equal number of amine and acid end groups, except as otherwise noted.

The adhesive performance was assessed by measuring lap-shear, sometimes called tensile-shear, between two metal coupons, one-inch wide bonded with one-half inch overlap, that is, with one-half square inch bonded area, usually with approximately 0.005″ glue line thickness. Test joints were prepared by laying 1″ x 3″ coupons in a holding jig designed to hold the metal coupons in required juxtaposition with an intervening film of a molded adhesive interlayer, slightly oversize, for example, 0.010″ thick if the glue line is to be 0.005″. The joint was heated for required time and temperature to seal or cure, the excess adhesive being squeezed to the edges. The cooled joint was pulled to destruction in an Instron testing machine at 0.02″/min. The test was run in duplicate. Average breaking strength was reported. A comparable test is described in Military Specifications, Mil–A–5090D.

Adhesive performance was also assessed by measuring T-peel strength between flexible metal substrates. Two flexible metal sheets, for example, 10″ x 10″, are stacked with an interlayer of slightly oversize adhesive foil, for example, 0.010″ thick, and with 0.005″ metal spacer shims at the four edges. This assembly was molded in a hot press for required time and temperature to seal or cure. Half-inch center-strips were cut and the metal strips were pulled apart at 180° orientation by the Instron testing machine at 10″/min. crosshead speed in Examples 1–7 and 2″/min. in Examples 8–22. The test was run in duplicate. An integrated average stress is reported in terms of pounds per lineal inch of glue line. A comparable test is described in Federal Specification MMM–A–132.

An accelerated test to measure resistance of adhesive performance to hot, humid exposure was carried out by exposing lap-shear specimens or half-inch T-peel specimens to atmospheric steam for 24 hours, cooling to room temperature, and testing to destruction in the Instron testing machine as previously described. Bond strengths deteriorated in several hours' steam exposure and then changed only slowly, if at all, on continued exposure, so that testing after 24 hours' exposure gave a first order approximation of residual strength, which approximates also the residual strength after lower temperature, lower humidity exposure for longer, indefinite times.

Example 1

A nylon polymer containing three polymer repeat units and composed of 48.6 mole percent caprolactam, 14.1 mole percent hexamethylene adipamide, and 37.3 mole percent hexamethylene sebacamide, which was soluble in hot ethanol, which had a crystalline melting point about 128° C., which had a melting index of 4.2, was blended on a rubber-mill with 0.93% by weight gamma-aminopropyltriethoxy silane, milling for about ten minutes at 150° C. to produce a silanated terpolymer having a melt index of 2.6.

The silanated terpolymer was premolded to about 0.010″ film between polytetrafluoroethylene-coated metal plates about 1 minute at 180° C. This film was assembled with 1″ x 3″ x 0.063″ aluminum coupons (Alclad 7075–T6) in a holding jig, as described above, and molded and sealed at 180° C. for 5 minutes. The coupon surfaces had been etched in acid-dichromate bath, washed and dried. The molded specimens were tested in quadruplicate, and an identical set was suspended in a steam bath for 24 hours, cooled to room temperature and tested in the same way.

For comparison, adhesive joints were prepared in the same way starting with the polyamide containing no silane.

The following results were obtained.

| Polyamide | Percent silane | Initial lap-shear, p.s.i. | Steamed lap-shear, p.s.i. |
|---|---|---|---|
| 6/66/610 | 0 | 2,140 | 40 |
| 6/66/610 | 0.93 | 2,815 | 1,190 |

Example 2

A polyamide of the same composition, solubility, and melting point as in Example 1, with a melt index of 2.4, was similarly blended on a rubber-mill with 1.16% by weight of gamma-aminopropyltriethoxy silane to silanated terpolymer of melt index 1.11.

A 0.010″ premolded film was assembled between degreased aluminum (2S) sheets 0.005″ thick with 0.005″ shims and molded and sealed at 180° for 10 minutes. Half-inch strips were tested in T-peel, as described above; parallel strips were tested after steam exposure for 24 hours.

For comparison the polyamide without added silane was compared in parallel tests with the following results:

| Polyamide | Percent silane | Initial T-peel, lbs./in. | Steamed T-peel, lbs./in. |
|---|---|---|---|
| 6/66/610 | 0 | 14 | 4 |
| 6/66/610 | 1.16 | 27 | 14 |

Example 3

The silanated terpolymer of Example 2 was dissolved in hot ethanol; blended with 15 g. of commercial bisphenol A-epichlorohydrin resin (having epoxy equivalent of about 190) per 85 g. of silanated polyamide; blended further with 1.3 g. of dicyandiamide per 85 g. of silanated polyamide to catalyze the epoxy curing. The solution was cast in thin film, air-dried, further dried at 70° C. under vacuum for one hour and premolded to about 0.010″ film at 180° C. for 1 minute.

This blend was tested in lap-shear and T-peel, as described in the preceding examples, except that molding and curing time was extended to 60 minutes at 180° C. The cured adhesive was insoluble on prolonged boiling in hot ethanol. Test results were:

Initial lap-shear, p.s.i. _____ 5445
Steamed lap-shear, p.s.i. _____ 3360
Initial T-peel, lb./in. _____ 60
Steamed T-peel, lb./in. _____ 54

For comparison this same blend was tested in T-peel, curing only 10 minutes at 180° C. After this limited curing time, the adhesive was still soluble in hot ethanol. Test results were:

Lb./in.
Initial T-peel _____ 43
Steamed T-peel _____ 39

Example 4

The silanated polyamide-diepoxide-dicyandiamide blend of Example 3 was tested in metal-metal T-peel, in this case between degreased 0.001″ Type 302 stainless steel.

| | Lb./in. |
|---|---|
| Initial T-peel | 35 |
| Steamed T-peel | 38 |

Example 5

A polyamide of the same composition, solubility, and melting point as in Example 1, with a melt index of 33, was similarly blended on a rubber-mill with 1.1% by weight of gamma-aminopropyltriethoxy silane. This was tested as described in Examples 1 and 2 in lap-shear and T-peel, before and after steaming with the following results:

| | |
|---|---|
| Initial lap-shear, p.s.i. | 3495 |
| Steamed lap-shear, p.s.i. | 1345 |
| Initial T-peel, lb./in. | 32 |
| Steamed T-peel, lb./in. | 16 |

The same polyamide was blended on a rubber-mill at 150° C. with about 10 minutes milling with 4.0 g. of commercial bisphenol A-epichlorohydrin resin (having an epoxy equivalent of about 190) plus 1.1 g. of gamma-aminopropyltriethoxy silane per 100 g. of polyamide. This blend was tested in lap-shear and T-peel, as above, before and after steaming, with the following results:

| | |
|---|---|
| Initial lap-shear, p.s.i. | 3980 |
| Steamed lap-shear, p.s.i. | 2935 |
| Initial T-peel, lb./in. | 38 |
| Steamed T-peel, lb./in. | 27 |

The seal time in this case of 10 minutes at 180° C. was shown to be insufficient to thermoset. The melt index of a sample of the rubber-milled blend was about 18, decreasing slowly at 190° C., but preserving its thermoplastic character for more than one hour.

Example 6

The polyamide of Example 1 was blended on the rubber mill with about 2% delta-aminobutylmethyldiethoxy silane. This product was then further blended as described in Example 3 with bisphenol A-epichlorohydrin resin and dicyandiamide and tested as described in Example 3 with the following results:

| | |
|---|---|
| Initial lap-shear, p.s.i. | 5105 |
| Steamed lap-shear, p.s.i. | 1560 |
| Initial T-peel, lb./in. | 40 |
| Steamed T-peel, lb./in. | 16 |

Example 7

The same blending procedure as described in Example 6 was repeated with exception that the silane used was a commercial material having the structure:

$$H_2N \cdot R \cdot NH \cdot R' \cdot Si(OC_2H_5)_3$$

Test results were:

| | P.s.i. |
|---|---|
| Initial lap-shear | 3360 |
| Steamed lap-shear | 1985 |

Example 8

A nylon polymer of the composition described in Example 1, containing one mole percent acetic acid as a molecular weight regulator, was melt-polymerized to contain 0.1 to 0.2 weight percent moisture. To the finished polymer melt while cooling from 245° C. to 220° C. was added 0.42% by weight of gamma-aminopropyltriethoxy silane in 5 equal increments at 10 minute intervals and the product was cast and cooled in air. The product had a melt index of 33.2.

The product was tested as described in Examples 1 and 2:

| | |
|---|---|
| Initial lap-shear, p.s.i. | 3570 |
| Steamed lap-shear, p.s.i. | 1370 |
| Initial T-peel, lb./in. | 30 |
| Steamed T-peel, lb./in. | 18 |

Blending under these conditions results in essentially complete reaction to triethoxy silane polymer end groups according to the following equation, wherein X and X' represent polyamide radicals:

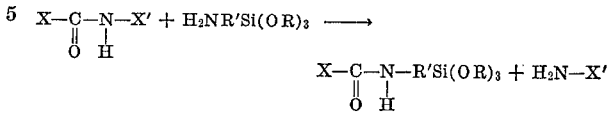

In contrast, when the polymer contains a subtantial excess of carboxyl ends over amine ends, crosslinking culminating in gelling to below melt index 0.1 occurs, apparently as a result of the following reaction:

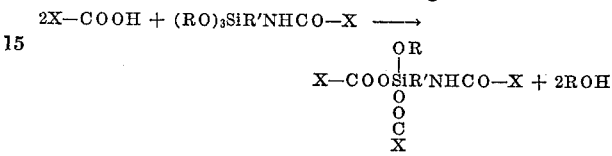

Example 9

To a nylon polymer melt of the composition described in Example 8 was added 0.94% by weight gamma-aminopropyltriethoxy silane in five equal increments over a period of 90 minutes while cooling from 280° C. to 230° C. The product was cast and cooled in air. The product had a melt index of 11.9.

This product was blended on a rubber mill at 140° C. for 3½ minutes with 15 g. of commercial diepoxide (derived from bisphenol A-epichlorohydrin having epoxy equivalent of about 190) per 85 g. of polyamide; blended further for 1½ minutes with 1.3 g. of dicyandiamide per 85 g. of polyamide; cooled promptly. A film was premolded at 150° C. and tested in lap-shear and T-peel, as described in Examples 1 and 2, except that molding and curing time was extended to 60 minutes at 180° C. The cured adhesive was insoluble on prolonged boiling in hot ethanol. Test results were:

| | |
|---|---|
| Initial lap-shear, p.s.i. | 5250 |
| Steamed lap-shear, p.s.i. | 2590 |
| Initial T-peel, lb./in. | 33 |
| Steamed T-peel, lb./in. | 26 |

For comparison, a polyamide-diepoxide-dicyandiamide blend of the same composition but containing no silane, similarly tested gave:

| | P.s.i. |
|---|---|
| Initial lap-shear | 5450 |
| Steamed lap-shear | 580 |

Example 10

To a finished nylon polymer melt of the composition described in Example 8 was added about 0.7% by weight beta-carbethoxyethyltriethoxy silane, and the melt was held at 235° C. for 45 minutes while a small amount of ethanol distilled forming bonds of formula

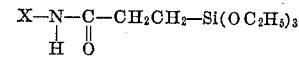

where X is polyamide. The product was cast and cooled in air. The product melt index was 26.7.

This product was blended with diepoxide and dicyandiamide substantially as described in Example 9 and in the same proportions. The blend was tested as in Example 9 with the following results:

| | |
|---|---|
| Initial lap-shear, p.s.i. | 4220 |
| Steamed lap-shear, p.s.i. | 1880 |
| Initial T-peel, lb./in. | 28 |
| Steamed T-peel, lb./in. | 20 |

Example 11

To a finished polymer melt of the same composition as described in Example 8 was added 0.94% by weight of gamma-aminopropyltriethoxy silane in 5 equal increments over a period of 40 minutes while stirring at 235°

C. Whereupon 0.6% by weight of ethylene glycol monobutyl ether was added and the melt stirred an additional 30 minutes at 235°–240° C. while a small amount of ethanol distilled. The product was cast and cooled in air. The product had a melt index of 7.0.

This product was blended with diepoxide and dicyandiamide substantially as described in Example 9 and in the same proportions. The blend was tested as in Example 9 with the following results:

| | |
|---|---|
| Initial lap-shear, p.s.i. | 5190 |
| Steamed lap-shear, p.s.i. | 2290 |
| Initial T-peel, lb./in. | 41 |
| Steamed T-peel, lb./in. | 37 |

Example 12

A polyamide was prepared of composition:

| | Mole percent |
|---|---|
| Poly(hexamethylene adipamide) | 16 |
| Poly(hexamethylene azelamide) | 28 |
| Poly(hexamethylene sebacamide) | 28 |
| Poly(hexamethylene dodecanediamide) | 28 |

This polymer was prepared with a nominal 1% excess hexamethylene diamine plus an equivalent 0.5% of diethylene triamine, corresponding to a nominal excess of 59.10$^{-6}$ eq./g. amine-ends. The product was cast and cooled in air. The product was soluble in hot ethanol, had a crystalline melting point about 157° C., had a melt index of 9.0.

This product was blended on a rubber mill at 180° C. for about 3 minutes with 1.4% by weight of beta-(3,4-epoxycyclohexyl)-ethyltrimethoxy silane and cooled promptly, yielding products of the formulae:

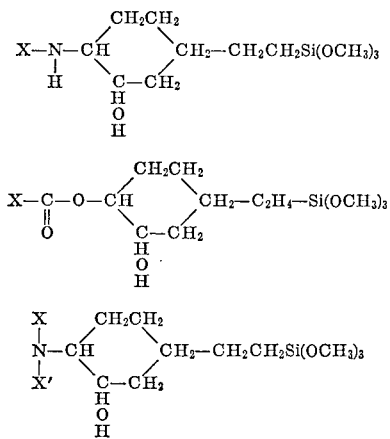

wherein X and X' are polyamide. A film was premolded at 180° C. for less than 1 minute and tested in lap-shear and T-peel, as described in Examples 1 and 2, except that the adhesive joints were molded at 230° C. for 5 minutes. The test results were:

| | |
|---|---|
| Initial lap-shear, p.s.i. | 4100 |
| Steamed lap-shear, p.s.i. | 3100 |
| Initial T-peel, lb./in. | 38 |
| Steamed T-peel, lb./in. | 18 |

Melt index of the silanated blend was 2.0, which approached zero after 12 minutes at 190° C.

For comparison the same polymer without the silane addition gave the following test results:

| | |
|---|---|
| Initial lap-shear, p.s.i. | 2300 |
| Steamed lap-shear, p.s.i. | 1800 |
| Initial T-peel, lb./in. | 1 |
| Steamed T-peel, lb./in. | 1 |

The same polymer and polymer blend were tested on steel substantially as described for aluminum, using vapor-degreased mild steel lap-shear coupons and using 0.006" mild steel sheets for testing without any cleaning, with the following results:

| | Without silane | With silane |
|---|---|---|
| Initial lap-shear, p.s.i. | 2,650 | 2,780 |
| Steamed lap-shear, p.s.i. | 900 | 1,480 |
| Initial T-peel, lbs./in. | 4 | 9 |
| Steamed T-peel, lbs./in. | 1 | 10 |

Example 13

The following ingredients were charged to a resin kettle:

| | Moles |
|---|---|
| Hexamethylene diamine | 1.5×0.99 |
| Diethylene triamine | 1.5×0.01 |
| Dimerized fatty acid | 1.5×0.36 |
| Adipic acid | 1.5×0.32 |
| Sebacic acid | 1.5×0.32 |
| Acetic acid | 1.5×0.014 |

0.2 g. of a silicone antifoam (Dow Corning Antifoam A)

The dimerized fatty acid was a commercially available hydrogenated and fractionated dimer acid containing 96% $C_{36}$ dibasic acid, about 4% $C_{54}$ tribasic acid and essentially no $C_{18}$ monobasic acid.

The charge was heated with stirring to distill off water at atmospheric pressure while gradually raising the temperature to 200° C. and purging with about 150 cc./min. of nitrogen. A sample was analyzed for end groups, and a small correction (2.1 g.) of hexamethylene diamine was added to give the desired slight excess of amine-ends. The polymer was finished by heating for about 2 hours while stirring and purging with nitrogen with the melt at 241–249° C. The product was discharged to "Teflon"-coated plates.

A sample of polymer was molded to a small disc, dried, encapsulated in a small crimped dish, melted, and annealed by programmed cooling at 0.2° C. per minute. The sample was evaluated by known methods by differential thermal analysis in a Du Pont "Differential Scanning Calorimeter" (DSC), comparing with known heat of fusion standards to obtain a heat of fusion of about 13 cal./g. melting over an apparent broad range from about 40–190° C. with a maximum at 163° C. The melted sample was program-cooled at 90° C. per minute in the DSC apparatus without detectable crystallization exotherm. This establishes a minimum cooling rate for quenching to the amorphous condition; faster cooling obviously would also avoid crystallization. At some undetermined slower rate crystallization would ensue.

The melt index of the sample at 230° C. was 43 decigrams/minute. Another sample was placed in the melt index apparatus while slowly raising the temperature to observe incipient flow at about 182° C. which was the minimum flow temperature or upper limit of the melting range.

Another sample was melted in a thin film on aluminum foil on a hot plate with a 250–300° C. surface. The sample was rapidly transferred to a chilled aluminum block. A small disc was cut and charged to the Du Pont 900 Thermal Mechanical Analyzer and program-heated to obtain a penetrometer softening point on the quenched sample of about 12° C. This procedure correlates well with a torsion modulus loss peak corresponding to the upper glass transition temperature.

A sample was found to contain 29×10$^{-6}$ equivalents per gram of carboxyl ends and 73×10$^{-6}$ equivalents per gram of amine ends which affords 44×10$^{-6}$ equivalents per gram of excess amine ends.

A 20 g. portion of the polyamide was blended at about 185° C. on a small rubber mill with 0.3 cc. of commercial gamma-aminopropyl triethoxy silane (Union Carbide, A1100), milled for 2 minutes, and cooled promptly by pressing between aluminum blocks.

Adhesive performance of the silanated polyamide was tested by molding a 5-mil film and placing it between 2 one-inch wide 0.007" thick strips of commercial low carbon steel ("backplate") without cleaning. The laminate was heated for 10 seconds under 20 p.s.i. pressure in a "Sentinel" hot bar sealer at about 300° C. and then rapidly quenched between large aluminum blocks at room temperature. The sample was promptly peeled in an Instron testing machine by bending the free ends of the laminate over ½ inch diameter free-rolling rolls spaced ⅝ inch on center in a testing jig, and pulling the free ends held together in one clamp with the jig in the other at the rate of 1" per minute. This is called a "quenched 360° peel." The integrated average peel force was 69 lb./lineal inch, corrected for the force to pull the 2 substrate strips through the jig without adhesive.

Another laminated strip sample, similarly sealed, was laid on a preheated aluminum block in an oven at 80° C. for 1 hour and then withdrawn and convection cooled. It was promptly tested as above showing an integrated, corrected peel force of 21 lb./lineal inch. This aging effect at 80° C. has been correlated with a similar slower effect in aging at room temperature.

Similar quenched 360° peel tests were made on "tin-free-steel" (TFS), in this case a commercial light chromium plated material sold by National Steel. The initial integrated corrected average peel force was 62 lb. per lineal inch and the peel force after 1 hour at 80° C. was 21 lb. per lineal inch.

The silanated polyamide was further tested for T-peel strength by molding a 5-mil film between two 8 inch by 8 inch sheets of 0.007" thick "blackplate" without cleaning in a molding press at 230° for 5 minutes, and cooling the platens with water. The observed integrated average T-peel strength was 34 lb. per lineal inch. A similar strip was exposed to atmospheric steam for 24 hours and gave an integrated average peel strength of 28 lb. per lineal inch. This steam exposure has been found to be a severe accelerated durability test. This molding procedure with relatively slow cooling ordinarily leads to crystallization of the adhesive which tends to result in lower performance. Also, it will be appreciated that the T-peel test procedure tends to give substantially lower numbers than the above-described 360° peel.

The silanated polyamide was tested further by molding at 230° C. for 5 minutes between 1 inch by 3 inch by 0.062 inch mild steel coupons (trichloroethylene vapor degreased) held in a jig to give about a 3-mil glue-line with ½ inch overlap, and cooling in the jig in the press over a period of several minutes. The test showed a lap-shear strength of 3200 pounds per square inch. Another set of coupons was exposed to atmospheric steam for 24 hours and tested at 1800 p.s.i.

The data described in this example are summarized in Tables I, II and III.

Example 14

Another 20 g. portion of the polyamide prepared in Example 13 was blended at about 185° C. on a small rubber mill with 0.3 cc. of commercial 3,4-epoxycyclohexylethyl trimethoxy silane (Union Carbide A–186) milled and cooled as in Example 13. Similar adhesive performance tests were made as in Example 13. The data obtained are given in Tables I, II and III.

Examples 15–22

Silanated polyamides of other compositions were prepared and tested using the procedure described in Example 13. The composition and properties of the polyamides are given in Tables I and II, the amount and type of silane used and the performance data obtained are given in Table III.

TABLE I

| Ex. No. | Diacid components, mole percent | | | Amine components, mole percent | |
|---|---|---|---|---|---|
| | Dimer | Adipic | Sebacic (or other) | Hexamethylene diamine | Diethylene triamine |
| 13 | 36 | 32 | 32 | 90 | 1 |
| 14 | 36 | 32 | 32 | 99 | 1 |
| 15 | 25 | 25 | 50 | 99 | 1 |
| 16 | 47 | 33 | 20 | 99 | 1 |
| 17 | 50 | 15 | 35 | 99 | 1 |
| 18 | 50 | 35 | 15 | 99 | 1 |
| 19 | 10 | 30 | 60 | 99 | 1 |
| 20 | 15 | 33 | 52 | 99 | 1 |
| 21 | 25 | 25 | [1] 50 | 99 | 1 |
| 22 | 33.3 | 33.3 | [2] 33.3 | 100 | 0 |

[1] Azelaic.
[2] Caprolactam.

TABLE II

| Example No. | Heat of fusion, cal./g. | Effective quenching rate, ° C./min. | Quenched glass transition temp. (° C.) | Melt index at 230° C. | Minimum flow temp. (° C.) | Excess amine ends, eq./g.×10$^6$ |
|---|---|---|---|---|---|---|
| 13 | 13 | 90 | 12 | 43 | 182 | 44 |
| 14 | 13 | 90 | 12 | 43 | 182 | 44 |
| 15 | 15 | 20 | 5 | 15 | 180 | 56 |
| 16 | 9 | 60 | −3 | 20 | 190 | 30 |
| 17 | 8 | 60 | 5 | 27 | 164 | 36 |
| 18 | 9 | 60 | 2 | 42 | 195 | 20 |
| 19 | 16 | 40 | 22 | 38 | 187 | 35 |
| 20 | 14 | 40 | 15 | 51 | 182 | 25 |
| 21 | 12 | 40 | 18 | 26 | 167 | 73 |
| 22 | 7 | 55 | 11 | 63 | 161 | 9 |

TABLE III.—MOLDED ADHESIVE PERFORMANCE

| Example No. | Silane | | Quenced 360° peel | | | T-peel, lbs./in. | | | Lap-shear, p.s.i. | |
|---|---|---|---|---|---|---|---|---|---|---|
| | Cc./100 g. | Type | Substrate | Initial | After 80° C./1 hr. | Substrate | Initial | After 24 hrs. steam | Initial | After 24 hrs. steam |
| 13 | 1.5 | A-1100 | Steel / TFS | 69 / 62 | 21 / 21 | Steel | 34 | 28 | 3,200 | 1,800 |
| 14 | 1.5 | A-186 | Steel / TFS | 69 / 96 | 17 / [1] 80 | do | 28 | 20 | 2,900 | 1,400 |
| 15 | 1.3 | A-186 | Steel | 85 | [2] 6 | Al | 9 | 17 | 4,000 | 3,800 |
| 16 | 1.5 | A-186 | Steel / TFS | 71 / 82 | 31 / 69 | Steel / Al | 44 / 26 | 16 / 29 | 2,300 / 3,200 | 1,200 / 2,500 |
| 17 | 1.0 | A-186 | Steel / TFS | 59 / 67 | 31 / 50 | Steel | 23 | 24 | 2,450 | 1,100 |
| 18 | 1.0 | A-186 | Steel / TFS | 49 / 60 | 10 / 48 | do | 18 | 18 | 1,800 | 500 |
| 19 | 1.2 | A-186 | Steel | 61 | [2] 17 | do | 5 | 5 | 2,300 | 1,300 |
| 20 | 1.0 | A-186 | do | 54 | 15 | do | 7 | 5 | 3,300 | 1,400 |
| 21 | 1.0 | A-186 | Steel / EP/TFS [3] | 56 / 86 | [2] 32 / [2] 38 | Steel / Al | 21 / 23 | 23 / 32 | 3,000 / 4,600 | 2,300 / 3,800 |
| 22 | 1.0 | A-186 | TFS | 52 | 23 | Steel | 33 | 28 | 2,250 | 770 |

[1] After 160° C. exposure for 5 minutes.
[2] After 24 hrs. exposure in steam.
[3] Tin-free-steel coated with commercial epoxyphenolic enamel.

Although the invention has been described and exemplified by way of specific embodiments, it is not intended that it be limited thereto. As will be apparent to those skilled in the art, numerous modifications and variations of these embodiments, such as the substitution of equivalents, can be made without departing from the spirit of the invention or the scope of the following claims. For example, substitution of one polymethylene chain for another has a relatively small predictable effect. But in any case substitutions can be empirically evaluated and shifts in relative proportions can be made to compensate, at least in part, for certain observed effects.

I claim:

1. An adhesive binder predominantly comprising a thermoplastic silanated polyamide prepared by melt blending a melt-polymerized polyamide consisting essentially of at least two different species of recurring hydrocarbylene groups of 2 to 48 carbon atoms selected from the group consisting of aliphatic and alicyclic groups joined by carboxyamido groups as integral parts of the main polymer chain, and having at least three different recurring polyamide repeat units, a crystalline melting point below 230° C., a melt index of 0.1 to 200, a moisture content of less than 0.5 weight percent, and at least as many amine ends as carboxyl ends, at a temperature above the crystalline melting point of the polyamide, with 0.1 to 3 percent, based on the weight of the polyamide, of silanating compound of the formula $(RO)_3—Si—R^1—Q$ in which R is alkyl or alkoxyalkyl, $R^1$ is hydrocarbylene of 2 to 40 carbon atoms selected from the group consisting of saturated aliphatics, saturated alicyclics, and aromatics, and Q is a radical selected from the group consisting of amine, oxirane, alkoxycarbonyl, carboxyl, hydroxyl, aldehyde, amide, anhydride, carbamate, isocyanate, isocyanide, isothiocyanate, isothiourea, ketoxime, lactide, mercapto, oxime, ozonide, peroxide, thial, thiocyanate and ureido.

2. An adhesive binder according to claim 1 in which the polyamide is alcohol soluble has recurring hydrocarbylene groups of 2 to 40 carbon atoms, a crystalline melting point below 190° C., and a melt index of 0.1 to 100, the hydrocarbylene group of the silanating compound is selected from the group consisting of saturated aliphatics and saturated alicyclics and Q is amine, oxirane or alkoxycarbonyl.

3. An adhesive binder according to claim 2 wherein the polyamide comprises at least two different species of recurring alkylene groups joined by carboxyamido groups.

4. An adhesive binder according to claim 3 in which the crystalline melting point is 120° to 190° C., the melt index is at least 1, the moisture content is less than 0.2 weight percent, and the hydrocarbylene group of the silanating compound is of 2 to 10 carbon atoms.

5. An adhesive binder according to claim 1 in which the polyamide has a moisture content of less than 0.2 weight percent, a melt index of 1–100 at 230° C., and is composed such that
   (a) 33–100 mole percent of the imine groups are derived from polymethylene diamine of 6 to 20 carbon atoms,
   (b) 5–65 mole percent of the carbonyl groups are derived from dimerized fatty acid of 16 to 48 carbon atoms,
   (c) 8–65 mole percent of the carbonyl groups are derived from polymethylene diacid of 6 to 18 carbon atoms, and
   (d) 8–65 mole percent of the carbonyl groups are derived from a monomer selected from the group consisting of
      (1) polymethylene diacid of 6 to 18 carbons which is different from diacid (c), and
      (2) polymethylene omega-aminoacid of 6 to 18 carbon atoms.

6. An adhesive binder according to claim 5 in which the polyamide is composed such that (a) 98–100 mole percent of the imine groups are derived from hexamethylene diamine,
   (b) 15–55 mole percent of the carbonyl groups are derived from dimerized fatty acid of 36 carbon atoms,
   (c) 10–45 mole percent of the carbonyl groups are derived from adipic acid, and
   (d) 15–55 mole percent of the carbonyl groups are derived from polymethylene diacid of 10 to 12 carbon atoms.

7. An adhesive binder according to claim 6 in which the melting point of the polyamide is 160° to 210° C.

8. An adhesive binder according to claim 7 in which the polyamide is composed such that
   (a) 98–100 mole percent of the imine groups are derived from hexamethylene diamine,
   (b) 25–55 mole percent of the carbonyl groups are derived from dimerized fatty acid of 36 carbon atoms,
   (c) 15–45 mole percent of the carbonyl groups are derived from adipic acid, and
   (d) 15–45 mole percent of the carbonyl groups are derived from polymethylene diacid of 10 to 12 carbon atoms.

9. A process for preparing the adhesive binder of claim 1 which comprises melt-blending a melt-polymerized polyamide consisting essentially of at least two different species of recurring hydrocarbylene groups of 2 to 48 carbon atoms selected from the group consisting of aliphatic and alicyclic groups joined by carboxyamido groups as integral parts of the main polymer chain, and having at least three different recurring polyamide repeat units, a crystalline melting point below 230° C., a melt index of 0.1 to 200, a moisture content of less than 0.5 weight percent, and at least as many amine ends as carboxyl ends, at a temperature above the crystalline melting point of the polyamide, with 0.1 to 3 percent, based on the weight of the polyamide, of silanating compound of the formula

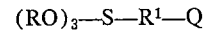

$$(RO)_3—S—R^1—Q$$

in which R is alkyl or alkoxyalkyl, $R^1$ is hydrocarbylene of 2 to 40 carbon atoms selected from the group consisting of saturated aliphatics, saturated alicyclics, and aromatics, and Q is a radical selected from the group consisting of amine, oxirane, alkoxycarbonyl, carboxyl, hydroxyl, aldehyde, amide, anhydride, carbamate, isocyanate, isocyanide, isothiocyanate, isothiourea, ketoxime, lactide, mercapto, oxime, ozonide, peroxide, thial, thiocyanate and ureido.

10. A process according to claim 9 in which the polyamide is alcohol soluble, has recurring hydrocarbylene groups of 2 to 40 carbon atoms, a crystalline melting point below 190° C., and a melt index of 0.1 to 100, the hydrocarbylene group of the silanating compound is selected from the group consisting of saturated aliphatics and saturated alicyclics and Q is amine, oxirane or alkoxycarbonyl.

11. A process according to claim 9 in which the polyamide has a moisture content of less than 0.2 weight percent, a melt index of 1–100 at 230° C., and is composed such that
   (a) 33–100 mole percent of the imine groups are derived from polymethylene diamine of 6 to 20 carbon atoms,
   (b) 5–65 mole percent of the carbonyl groups are derived from dimerized fatty acid of 16 to 48 carbon atoms,
   (c) 8–65 mole percent of the carbonyl groups are derived from polymethylene diacid of 6 to 18 carbon atoms, and
   (d) 8–65 mole percent of the carbonyl groups are derived from a monomer selected from the group consisting of
      (1) polymethylene diacid of 6 to 18 carbons which is different from diacid (c), and
      (2) polymethylene omega-aminoacid of 6 to 18 carbon atoms.

12. A process according to claim 11 in which the polyamide is composed such that
 (a) 98-100 mole percent of the imine groups are derived from hexamethylene diamine,
 (b) 15-55 mole percent of the carbonyl groups are derived from dimerized fatty acid of 36 carbon atoms,
 (c) 10-45 mole percent of the carbonyl groups are derived from adipic acid, and
 (d) 15-55 mole percent of the carbonyl groups are derived from polymethylene diacid of 10 to 12 carbon atoms.

13. A process according to claim 11 in which the polyamide is composed such that
 (a) 98-100 mole percent of the imine groups are derived from hexamethylene diamine,
 (b) 25-55 mole percent of the carbonyl groups are derived from dimerized fatty acid of 36 carbon atoms,
 (c) 15-45 mole percent of the carbonyl groups are derived from adipic acid, and
 (d) 15-45 mole percent of the carbonyl groups are derived from polymethylene diacid of 10 to 12 carbon atoms.

14. A process for forming moisture-resistant bonds between bare metal substrates which comprises heating the adhesive binder of claim 1 at a temperature above the crystalline melting point of the polyamide, between and in contact with said substrates.

15. An adhesive binder according to claim 1 in which Q is amine or oxirane radical.

16. An adhesive binder according to claim 15 in which the polyamide has $10-100 \times 10^{-6}$ equivalents per gram of excess amine ends.

17. An adhesive binder according to claim 16 in which 0.5 to 1 mole percent of the imine groups are derived from diethylene triamine, and Q is an oxirane radical.

References Cited
UNITED STATES PATENTS

| | | | |
|---|---|---|---|
| 2,970,077 | 1/1961 | Groves | 260—830 |
| 3,288,754 | 11/1966 | Green | 260—824 |
| 3,306,800 | 2/1967 | Plueddemann | 260—824 |
| 3,341,501 | 9/1967 | Hedrick et al. | 260—824 |

OTHER REFERENCES
Epoxy Resin, Lee et al., McGraw-Hill Book Co., Inc. (1957), p. 110 and p. 228.

DONALD E. CZAJA, Primary Examiner

E. C. RZUCIDLO, Assistant Examiner

U.S. Cl. X.R.

156—332; 161—207, 214; 220—81 R; 260—18 S, 78 SC, 824 EP